June 15, 1943.  E. V. SORENY  2,322,067
FLASHLIGHT SYNCHRONIZING DEVICE
Filed June 20, 1940
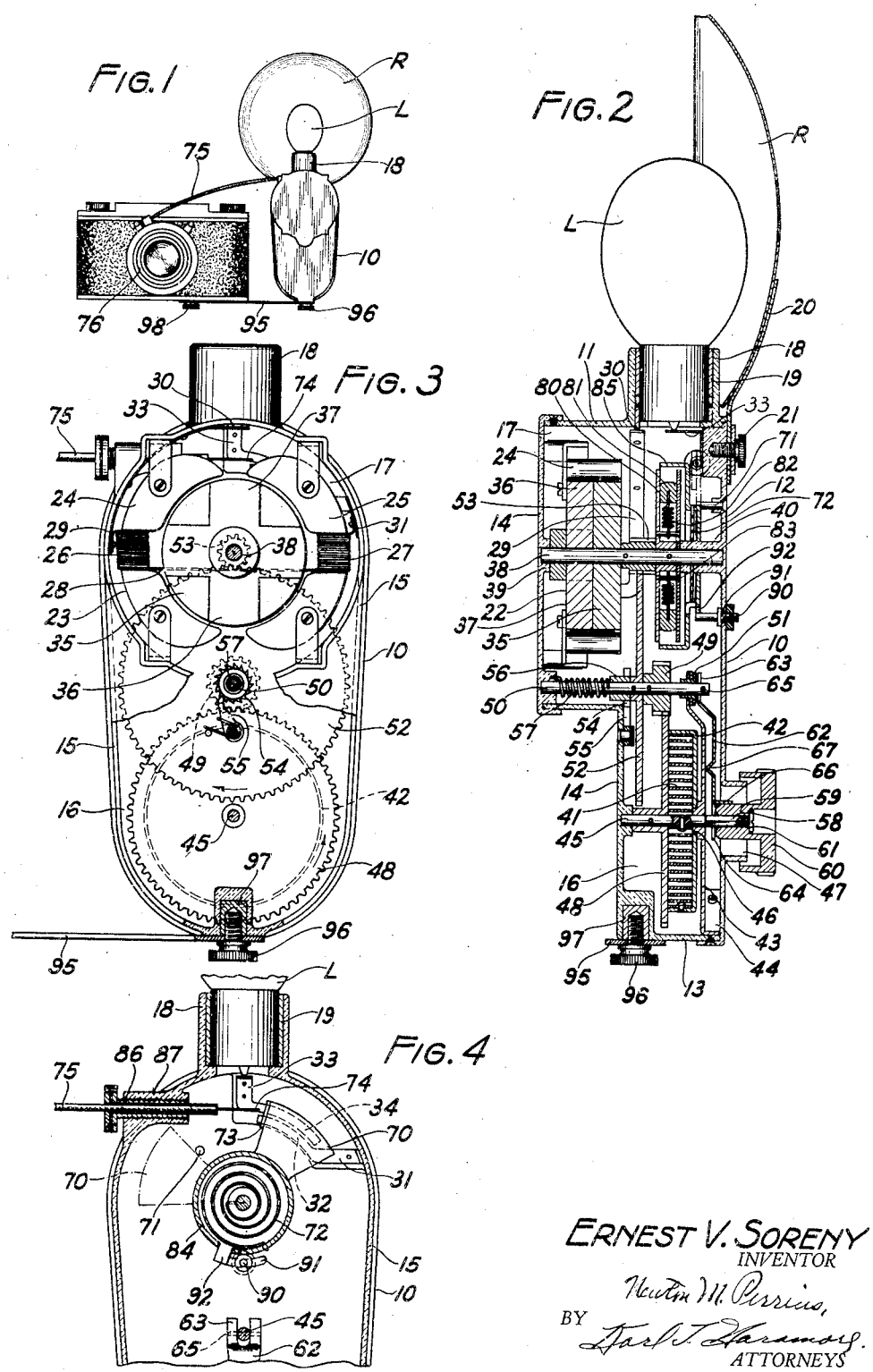
Ernest V. Soreny
INVENTOR
BY
ATTORNEYS Patented June 15, 1943

2,322,067

UNITED STATES PATENT OFFICE 2,322,067

FLASHLIGHT SYNCHRONIZING DEVICE

Ernest V. Soreny, Rochester, N. Y., assignor to Eastman Kodak Company, Rochester, N. Y., a corporation of New Jersey Application June 20, 1940, Serial No. 341,528

9 Claims. (Cl. 67—29)

The present invention relates to flashlight synchronizers for photographic cameras, and particularly to a synchronizer which generates its own electricity and thus eliminates the use of batteries.

It has been found that dry cell batteries are not always the best electrical source for the ignition of flash lamps. First of all, the proper synchronization of a flash lamp and opening of a camera shutter is dependent upon a constant value of potential. The potential of dry cell batteries tends to decrease with age and use, and consequently, they have to be replaced at frequent intervals to insure a proper operation of a flash synchronizer. If a synchronizer is adjusted to operate with new batteries, then when the batteries tend to become weaker and the time necessary to ignite the lamp after closing the lamp circuit is longer than that for which the synchronizer is adjusted, then the synchronization is thrown off. The batteries gradually lose their potential with age and use until such time as they will not even ignite a flash lamp, and the operator has no way of knowing when the batteries in his synchronizer have weakened sufficiently to throw off the initial adjustment of the device. Finally, repeated use causes quick polarization of the batteries by electrochemical reaction in the cells. Therefore, in order to insure accurate flashlight exposures it is necessary to frequently renew the batteries in the synchronizer using such a source of potential, and such a procedure, other than being expensive, necessitates the user carrying around a supply of batteries; particularly if he is on an assignment where batteries are not readily obtainable. Even when batteries are obtainable it is uncertain as to how long they have been on the dealer's shelves.

Therefore, one object of the present invention is to provide a flash synchronizer for photographic cameras which includes an electric generating machine for generating the current necessary to ignite the flash lamps, thereby eliminating the use of dry cell batteries as a source of potential.

Another object is to provide a flashlight synchronizer of the type described which includes an open electrical circuit between the generating machine and the flash lamp which is adapted to be closed by a circuit closing member driven from the rotatable part of the generating machine, and which circuit closing member is also adapted to actuate a shutter release member in timed relation to a closing of said circuit.

And still another object is to provide a synchronizer of the type described wherein the circuit closing member is normally moved to an inoperative position, and connected to, and moved by, said movable part of the generating machine only when said machine is generating a sufficient amount of current to ignite the flash lamp.

And yet another object is to provide a synchronizer of the type described wherein the relative positions of the shutter release and the circuit closing member may be adjusted to vary the time relation of the circuit closing and the shutter operation in accordance with different shutter speeds.

And still a further object is to provide a synchronizer of the type described which is simple and efficient in operation, neat in appearance, and compact and portable so that it can be readily attached to any camera with which it is to be used.

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawing in which, Fig. 1 is a front view of a photographic camera with a flash synchronizer, constructed in accordance with the present invention, connected thereto Fig. 2 is a vertical section taken through a flash synchronizer constructed in accordance with one, and the preferred, embodiment of the present invention, Fig. 3 is a front view of the synchronizer shown in Fig. 2, and with the front plate removed, and Fig. 4 is a partial rear view of the upper end of the synchronizer with the rear plate removed, and showing the manner of adjusting the shutter release relative to the circuit closing member for adjusting the time relation of the circuit closing and shutter release in accordance with different shutter speeds.

Like reference characters refer to corresponding parts throughout the drawing.

Referring now to the drawing, the synchronizer, according to one embodiment of the invention, may comprise a housing 10 including a top wall 11, a rear wall 12, a bottom wall 13, and a front wall 14, all joined by a side wall 15 to form a lower chamber 16 and an upper chamber 17 which is larger than said lower chamber. This housing may be formed of any suitable material, such as metal, or a molded plastic, etc., and in the present instance it will be assumed that the same is formed of a molded plastic material, since such is an insulator for electricity and simplifies the electrical connections of the several parts within the device. The top wall 11 is formed with a socket housing 18 communicating with the interior of the housing, and in which is located a bayonet slotted metal socket 19 adapted to receive the base of one of the small flash lamps L now on the market. I have chosen to show the use of a bayonet-lock lamp socket, but it is to be understood that any type of socket, including the conventional screw-threaded socket, could be used if desired. A reflector R may be situated behind the lamp L by having an arm 20 connected thereto held to the rear of the housing by a bolt 21.

In the forward part of the upper chamber 17 is located an electric generating machine which may be of any well known form, and which, for the purpose of setting forth the present invention, has been shown as comprising a rotatable inductor 22 and a fixed armature 23. The fixed armature 23 may comprise two parts 24, 25 of magnetic material in the form of the crescents including field windings 26 and 27, all surrounding the inductor 22. The field windings are connected in series by means of a conductor indicated at 28. The winding 26 is connected by conductor 29, fixed to the housing, to the metal socket 19, the conductor engaging a projection 30 on the lower end of the socket projecting into the upper chamber 17. The winding 27 is connected to a contact 31 terminating in an arcuate portion 32 on, or adjacent, the upper end of the rear wall of the housing. A second contact 33, also located on the rear wall of the housing, has one end positioned below the socket to be engaged by a lamp L inserted therein, and has an arcuate portion 34 lying adjacent to, but spaced from, said first contact for the purpose hereinafter described, see Fig. 4. It will be readily appreciated that by virtue of the spaced contacts 31 and 33 the electric circuit from the electric generating machine to the lamp is normally opened until contacts 31 and 33 are connected, as will be hereinafter fully set forth.

The inductor 22 may comprise a disk of heavy metal 35, such as lead, and having a plurality of radial cut-outs arcuately spaced, in this instance four, in which cut-outs a permanent magnet 36, in the form of a cross, may be located so that the assembled disk forms a flywheel having four magnetic poles 37. The inductor 22 is fixed to a shaft 38 extending through the upper chamber 17 and journaled at opposite ends in bearings 39 and 40 formed in the front and rear walls, respectively, of the housing.

The inductor is adapted to be driven by a spring motor 41 in the following manner for the purpose of generating the electricity for igniting the flash lamp. Referring to Fig. 2, a spring motor 41 is located in the lower chamber 16 and the casing 42 thereof is fixed to a supporting bracket 43 attached to the housing at 44 in any suitable manner. The motor shaft 45 extends across the lower chamber and has one end journaled in a bearing in the front wall and the other end journaled in a sleeve 46 carried by the supporting bracket 43, and through which the shaft extends into an opening 47 on the rear wall. Fixed to the motor shaft 45 is a large spur gear 48 which meshes with a pinion 49 fixed to an intermediate shaft 50 extending parallel to the motor shaft, and being slidably and rotatably mounted in a bearing in the front wall and a sleeve 51 in the upper end of the supporting bracket 43 to move in an axial direction for the purpose hereinafter set forth.

Fixed to the intermediate shaft 50 is another large spur gear 52 which meshes with and drives a pinion 53 fixed to the shaft 38 on which the inductor 22 is fixed. The intermediate shaft 50 also has fixed thereto a ratchet 54 which is normally engaged by a spring pressed pawl 55 mounted on the front wall of the housing, and the purpose of this pawl and ratchet is to prevent the gearing from rotating in a direction induced by the spring in unwinding, or in other words, to hold the spring in a tensioned position when wound up. The pawl 55 is released from the ratchet 54 to free the drive when the intermediate shaft 50 is moved to the right, looking at Fig. 2, whereby the ratchet is moved away from the pawl which falls onto a smooth shoulder 56 thereof which is the same diameter as the base of the teeth of the ratchet so that the two can readily move back into engagement under the action of the tension spring 57, one end of which is fastened to the housing and the other end of which is attached to the ratchet.

For the purpose of simplicity and ease of operation it is desirable that the motor be wound and released by the operation of a single member. To this end, the motor shaft is provided with a squared end 58 onto which a sleeve 59 on the winding knob 60, and having a square hold corresponding thereto, is slipped and held by an attaching screw 61. By virtue of this connection, the motor shaft will be rotated by a rotation of the winding knob, but the knob can be slid axially of the shaft, which axial movement, in the present instance, is utilized to release the spring motor. A motion transmitting bar 62, of the shape best shown in Fig. 2, is provided with yokes 63 and 64 at either end which are adapted to surround the intermediate and motor shafts 50 and 45, respectively. The upper yoke 63 bears against a pin 65 extending transversely through the intermediate shaft, and the lower yoke 64 bears against the end of the sleeve 59 on the winding knob, the stamping from said lower yoke being turned up as shown at 66 to form a projection adapted to rest on the top of the sleeve to prevent the bar 62 from dropping down out of position. The bar 62 is provided with a protuberance 67 which bears against the supporting bracket 43 to form a fulcrum for the bar when the respective ends of the same are moved axially, in one instance by the action of tension spring 57, and in the other instance by an inward thrust on the winding knob. The parts will normally assume the position shown in Fig. 2 when the drive is in the locked position. In order to release the spring motor, the winding knob is pushed inwardly, whereupon the sleeve 59 pivots the bar 62 about its fulcrum 67 and the upper end of the bar pushes against the pin 65 to move the intermediate shaft to the right and thereby release the ratchet from the pawl. It will be noticed that the pinions 49 and 53 are wide enough to permit the necessary axial movement of the intermediate shaft in releasing the motor without causing the spur gears engaging the same to be disconnected therefrom.

Referring now to Fig. 4, the electric circuit to the lamp is adapted to be closed by a rotatable switch member 70 which bridges and connects the two spaced arcuate portions 32 and 34 of the two spaced contacts 31 and 33. The switch member 70 is normally moved to its inoperative position, see dotted line position in Fig. 4, against a stop pin 71 projecting into the chamber 17 in the rear wall, by a coil spring 72. The switch member 70 is provided with an upstanding ear 73 which is adapted to engage and depress the end 74 of a cable of a conventional shutter cable release 75, the other end of which is adapted to be detachably connected to the shutter 76 of a camera in a known manner, and as illustrated in Fig. 1.

The switch member 70 is adapted to be drivingly connected to the shaft 38 so as to be rotated to its operative position by rotation of the inductor. However, it is desirable that such switch member is not moved to close the electric circuit until such time as the generating machine is generating sufficient current to flash the lamp, otherwise the device would be ineffective. To obtain this result the drive between the switch member 70 and the shaft 38 is normally ineffective, and does not become effective until such time as the inductor 22 is rotating at a speed necessary to generate sufficient current to ignite the lamp.

To this end, I have chosen to show a friction clutch of the centrifugal type between the switch member 70 and the shaft 38, although it will be obvious that various other arrangements, mechanical or electrical, could be used to obtain the result desired. Referring to Fig. 2, a flanged reel 80 is pinned to the shaft 38 to rotate therewith. A plurality of weighted friction pads 81, preferably four, are slidably guided between the flanges of the reel 80 and are each pulled radially toward the hub of the reel by a coil spring 82 connected at one end to the pad, and at the other end to a pin 83 extending between the flanges parallel, and adjacent to the hub of the reel. The switch member 70 is coaxial with the shaft 38 but is rotatable relative thereto, and includes a cup portion 84 the flange 85 of which is adapted to extend across, and adjacent to, the periphery of the flanges of the reel 80, and into a position to be engaged by the friction pads 81 when they fly outwardly under centrifugal force. Consequently, after the spring motor is released to drive the inductor 22 through the shaft 38, the reel 80 will rotate with the shaft 38 until the speed of rotation reaches a given value at which time the friction pads 81 will fly outward and engage the switch member 70 and rotate the same to close the electric circuit and actuate the shutter. It will be obvious that the centrifugal clutch will be adjusted to pick up the switch member when, and only when, the generating machine is generating sufficient current to ignite the flash lamp. This speed of rotation will necessarily depend upon the construction of the generating machine and will not be a definite figure. By way of example as to what potential is needed to ignite an ordinary flash lamp, I have found that a potential of 1-watt at 3 to 4-volts for 17 milliseconds is suitable to ignite an ordinary flash lamp.

It is a known fact that most flash lamps do not reach their peak of illumination until about .020 of a second after the circuit thereof has been completed, and that all lamps, with the exception of those designed for use with focal plane shutters, have a more or less decided peak of illumination. Now considering the fact that most between-the-lens types of shutters have a lag of approximately .007 to .010 of a second, as the time between the actuation and the time the shutter is fully opened is known as, it will be obvious that the lamp circuit must be completed prior to the time the shutter is actuated in order to insure the inclusion of the peak of illumination during the time the shutter is wide open. It is for this reason, that the parts of the present invention are so arranged as to give a closed lamp circuit in advance of the instant the shutter is operated.

It will also be obvious that the interval between the completion of the lamp circuit and the actuation of the shutter will vary in accordance with different shutter speeds. For instance, if a given lamp is used having a peak of illumination of .002 of a second duration, and a $\frac{1}{25}$ of a second, or .040 of a second, shutter speed is to be used, then it stands to reason that in order to obtain the maximum light, the shutter must be fully opened prior to the time the lamp reaches its peak of illumination. This might necessitate closing the lamp circuit and actuating the shutter almost simultaneously so that the shutter will be opened before, during, and after the time the lamp reaches its peak of illumination. On the other hand, if a shutter speed of say $\frac{1}{500}$ of a second, or .002 of a second, is to be used, it will be seen that the shutter must be opened just before the lamp reaches its peak of illumination in order to include the same. This will necessitate a considerable interval between the completion of the circuit and the actuation of the shutter, or approximately .012 of a second, the difference between the lag of the lamp and the lag of the shutter.

So that the present synchronizer can be readily adjusted in accordance with different shutter speeds, means are provided for adjusting the position of the end of the cable of the shutter release relative to the spaced contacts of the circuit, and in the path of the switch member 70. To this end, the end of the cable release 75 is fixed in a tube 86 which is threaded into a socket 87 in the side wall 15 of the housing 10. By screwing this tube 86 into, or out of, the housing the end 74 of the cable 75 may be moved toward or away from the spaced contacts 31 and 33 of the lamp circuit so as to alter the time interval between the completion of the circuit and the actuation of the shutter. The face of the head on the tube 86 may include an index cooperating with a scale on the side wall of the housing, not shown, to aid in adjusting the parts in accordance with given shutter speeds. It will be readily understood that the contacts could be mounted on a plate to be adjustable relative to the end of the cable, just as well as to adjust the cable relative to the contacts, if desired, in order to obtain the result set forth; and the arrangement set forth has been shown as only one way of accomplishing the desired result.

It is known to those skilled in the art that different photographic shutters require different amounts of movement of the cable of the shutter release to actuate them. Thus, if the cable of the release is given a small movement when the shutter requires a large movement, then the shutter will not be operated. On the other hand, if the shutter requires a small movement and the cable is given a large movement, the shutter may be damaged. To take care of these two contingencies, the present device includes an adjustable stop pin 90, see Figs. 2 and 4, which extends through an arcuate slot 91 in the rear wall 12 and into the path of a radial projection 92 on the switch member 70. This stop pin limits the extent of movement of the switch member 70 when moving to its operative position, and by adjusting the position of the stop pin in the arcuate slot, the amount the cable is moved by the switch member can be suited to the particular shutter with which the device is to be used.

The device may be connected to a camera, with which it is to be used, by means of a bar 95 one end of which is connected to the housing 10 by a screw 96 engaging a threaded socket 97 in the base thereof; the other end of the bar being connected to the camera by a screw 98 adapted to engage the tripod screw socket provided on most well-known cameras, see Fig. 1.

The operation of the device will now be described. After the synchronizer has been connected to the camera, and tube 86 for the cable release has been adjusted in accordance with the desired shutter speed, the adjustable stop pin 90 is properly located to permit the proper movement of the shutter release cable for the camera shutter in use. Then the spring motor should be wound by rotating the knob 60. The motor will be held in a tensioned condition by virtue of the pawl and ratchet 55, 54. When it is desired to take a picture, the knob 60 is pressed axially, whereupon the ratchet 54 will be moved away from the pawl 55 to release the spring motor and permit it to drive the shaft 38. When the inductor 22 is rotating at a given speed necessary to generate a current which will be sufficient to ignite a flash lamp, the centrifugal clutch connects the switch member 70 to the shaft 38 whereupon it is rotated from its normal inoperative position to its operative position, see Fig. 4, during which movement, the lamp circuit is closed and the shutter is actuated in proper timed relation to give a flashlight picture. When the motor runs down, all of the parts return to their inoperative positions and are ready for a repeat operation merely by a rewinding of the spring motor.

From the above description it will be readily appreciated that the present invention provides a compact and simple flash synchronizer which generates its own electricity thus doing away with the use of dry cell batteries as is customary with known synchronizers of this type. The mechanism is so arranged that the lamp circuit is not closed until such time as the machine is generating a given, and sufficient, current to ignite a flash lamp, so that the device is always operating at the potential for which it was initially adjusted regardless of its age or number of operations. This results in a particularly accurate synchronization unattainable with devices using batteries as a source of potential unless the batteries are frequently renewed, and such batteries are fresh. In addition, the device is adapted for adjustment in accordance with different shutter speeds, which adjustment is highly advantageous and unique to a device of this kind.

Although I have shown and described certain specific embodiments of my invention, I am fully aware that many modifications thereof are possible. My invention, therefore, is not to be restricted except in so far as is necessitated by the scope of the appended claims.

Having thus described my invention, what I claim is new and desire to secure by Letters Patent of the United States is:

1. In an electro-mechanical flashlight synchronizing device the combination comprising an electric generating machine, a mechanism serving to put into motion the movable part of said machine, a flash lamp, an open electric circuit between said lamp and said machine, a shutter release adapted to be connected to the shutter of a photographic camera, a member movable to and from an operative position wherein it closes said circuit and actuates said shutter release, and normally moved from said operative position, means for connecting said member to said movable part of the machine to be moved thereby to said operative position, said connecting means including a clutch which is normally ineffective, and is adapted to become effective only when the movable part of said machine is moving at a speed necessary to generate sufficient current to ignite said flash lamp.

2. In an electro-mechanical flashlight synchronizing device the combination comprising an electric generating machine, a mechanism serving to put into motion the movable part of said machine, a flash lamp, an open electric circuit between said lamp and said machine, a shutter release adapted to be connected to the shutter of a photographic camera, a member movable to and from an operative position wherein it closes said circuit and actuates said shutter release, and normally moved from said operative position, means for connecting said member to said movable part of the machine to be moved thereby to said operative position, said connecting means including a normally inoperative friction clutch which is adapted to drivingly connect said member and movable part only when said movable part is moving at, or above, a given speed, and at which speed the machine is generating sufficient current to ignite the flash lamp.

3. In an electro-mechanical flashlight synchronizing device the combination comprising an electric generating machine, a mechanism serving to put into motion the movable part of said machine, a flash lamp, an open electric circuit between said lamp and said machine, a shutter release adapted to be connected to the shutter of a photographic camera, and means moved by the movable part of said machine for closing said circuit and operating said shutter release, said means adapted to close said circuit at a given time prior to operating said shutter release for insuring a synchronized flashing of the lamp and operation of the shutter, and including a clutch which is normally ineffective and is adapted to become effective only when said movable part of said machine is moving at a speed necessary to generate a sufficient current to ignite said flash lamp, and means for shifting the position of said shutter release in the path of, and relative to, the means for operating the same, whereby the time interval between the closing of said circuit and the release of the shutter can be varied to insure synchronization at different shutter speeds.

4. In an electro-mechanical flashlight synchronizing device the combination comprising an electric generating machine including a rotatable part, a spring motor for driving said rotatable part, a gear drive between said spring motor and said rotatable part and including a shaft rotatable with said part, a flash lamp, and an open electric circuit between said lamp and the machine, a shutter release adapted to be connected to the shutter of a photographic camera, a rotatable member for closing said circuit and operating said shutter release in a given timed relation, said member mounted to rotate relative thereto and normally held against rotation in an inoperative position, means for drivingly connecting said member to said shaft, said connecting means including a governor controlled clutch, a part of the clutch being connected to said shaft, whereby said member is connected to, and moved by, said shaft to close said circuit and actuate said shutter release only after said rotatable part has attained a given speed.

5. In an electro-mechanical flashlight synchronizing device the combination comprising a housing, an electric generating machine in said housing and including a rotatable part, a spring motor in said housing for driving said rotatable part, a flash lamp socket on the exterior of said housing for receiving a flash lamp, an open electric circuit in said housing between said socket and said machine, a shutter cable release having one end adapted to be connected to a photographic shutter and the other end extending into said housing, a rotatable member in said housing adapted when moved to engage and move the end of said shutter cable extending into said housing to actuate the shutter and close said circuit in proper timed relation, a governor controlled clutch for connecting said member to said rotatable part when said machine is generating sufficient current to ignite said lamp, and means for adjusting the end of said cable in said housing in the path of, and relative to, said rotatable member, whereby the time interval between the closing of said circuit and release of said shutter may be varied in accordance with different shutter speeds.

6. In an electro-mechanical flashlight synchronizing device the combination comprising an electric generating machine including a movable part, a flash lamp, an open electric circuit between said flash lamp and said machine, a shutter release adapted to be connected to the shutter of a photographic camera, a spring motor for driving said movable part, a single member for winding and releasing said spring motor, and means operated by the movable part of said machine for closing said circuit and operating said shutter release in a given timed relation to insure a synchronized flashing of the lamp and operation of the shutter.

7. In an electro-mechanical flashlight synchronizing device the combination comprising an electric generating machine including a movable part, a flash lamp, an open electric circuit between said flash lamp and said machine, a shutter release adapted to be connected to the shutter of a photographic camera, a spring motor for driving said movable part, a winding knob connected to the motor shaft to wind said spring motor, and movable axially of said shaft for releasing said spring motor, and means operated by the movable part of said machine for closing said circuit and operating said shutter release in a given timed relation to insure a synchronized flashing of the lamp and operation of the shutter.

8. In an electro-mechanical flashlight synchronizing device the combination comprising an electric generating machine, a mechanism serving to put into motion the movable part of said machine, a flash lamp, a normally open electric circuit connecting said machine and said lamp, a movable contact for closing said circuit and normally moved to an inoperative position, a shutter release adapted to be connected to the shutter of a photographic camera, and adapted to be engaged and operated by said contact when the same is moved to its circuit closing position, and means for connecting said contact to said movable part, whereby said contact is adapted to be moved thereby to close said circuit and operate said shutter release in a given timed relation, said connecting means including a clutch which is normally ineffective until the movable part of said machine attains a predetermined speed at which sufficient current to flash the lamp is generated.

9. In an electro-mechanical flashlight synchronizing device the combination comprising an electric generating machine, a mechanism serving to put into motion the movable part of said machine, a flash lamp, an electric circuit connecting said machine and said lamp, a normally open switch in said circuit, a shutter release adapted to be connected to the shutter of a photographic camera, and adapted to be engaged and operated by said switch when the same is moved to its circuit closing position, and means for connecting said switch to said movable part whereby said switch is adapted to be moved thereby to close said circuit and operate said shutter release in a given timed relation, said connecting means including a clutch mechanism which is normally ineffective until the movable part of said machine attains a predetermined speed at which sufficient current to flash the lamp is generated, and means for adjusting the relative positions of said switch and the shutter release, whereby the time relation of the closing of the circuit and the release of the shutter can be varied in accordance with different shutter speeds.

ERNEST V. SORENY.